(12) United States Patent
Wimille et al.

(10) Patent No.: US 12,533,189 B2
(45) Date of Patent: Jan. 27, 2026

(54) SYSTEMS AND METHODS OF DYNAMIC REACHABILITY VISUALIZATION FOR TRAJECTORY PLANNING

(71) Applicant: GE Precision Healthcare LLC, Waukesha, WI (US)

(72) Inventors: Benjamin Wimille, Versailles (FR); Maxime Taron, Boulogne Billancourt (FR); Yves Trousset, Palaiseau (FR)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 117 days.

(21) Appl. No.: 18/525,338

(22) Filed: Nov. 30, 2023

(65) Prior Publication Data
US 2025/0177043 A1    Jun. 5, 2025

(51) Int. Cl.
*A61B 34/10* (2016.01)
*A61B 6/00* (2024.01)
(Continued)

(52) U.S. Cl.
CPC ............... *A61B 34/10* (2016.02); *A61B 6/12* (2013.01); *A61B 6/4441* (2013.01); *A61B 6/465* (2013.01); *A61B 2034/107* (2016.02)

(58) Field of Classification Search
CPC ..... A61B 34/10; A61B 2034/107; A61B 6/12; A61B 6/4441; A61B 6/465
See application file for complete search history.

(56) References Cited

U.S. PATENT DOCUMENTS 8,165,660 B2    4/2012  Pfister et al.
8,731,643 B2 *  5/2014  Von Roden ............ A61B 6/466
                                                         600/407
(Continued)

FOREIGN PATENT DOCUMENTS

CN        104470458 A      3/2015
DE     102012200686 A1     1/2013

OTHER PUBLICATIONS

Freundt, Miriam I. E. et al., Laser-Guided Cervical Selective Nerve Root Block with the Dyna-CT: Initial Experience of Three-Dimensional Puncture Planning with an Ex-Vivo Model, PLOS ONE, Jul. 19, 2013, pp. 1-14, https://journals.plos.org/plosone/article/figures?id=10.1371/journal.pone.0069311.

(Continued)

*Primary Examiner* — Sean D Mattson
(74) *Attorney, Agent, or Firm* — Fletcher Yoder, P.C.

(57) ABSTRACT

A processor-implemented method includes accessing or acquiring one or more images from a medical imaging device. The processor-implemented method also includes receiving an indication of one or more constraints associated with one or more physical characteristics of the medical imaging device, an interventional device, or both, and receiving an indication of a target point in the one or more images. The target point may specify an intended location of the interventional device. The processor-implemented method also includes determining corresponding reachability regions for each of the one or more images based on the target point and the one or more constraints. Each corresponding reachability region includes reachable paths for the interventional device between one or more reachable entry points and the target point. The processor-implemented method also includes overlaying the corresponding reachability regions upon each of the one or more images and displaying the one or more images.

18 Claims, 10 Drawing Sheets

(51) Int. Cl.
  *A61B 6/12*   (2006.01)
  *A61B 6/46*   (2024.01)

(56) References Cited

U.S. PATENT DOCUMENTS

| | | | | |
|---|---|---|---|---|
| 2009/0259230 | A1* | 10/2009 | Khadem | A61B 34/20 |
| | | | | 128/898 |
| 2009/0274271 | A1* | 11/2009 | Pfister | A61B 90/13 |
| | | | | 378/65 |
| 2010/0111389 | A1* | 5/2010 | Strobel | A61B 6/12 |
| | | | | 378/62 |
| 2014/0303662 | A1* | 10/2014 | Aoyagi | A61B 17/3403 |
| | | | | 606/185 |
| 2017/0348056 | A1* | 12/2017 | Steinle | B25J 9/1666 |
| 2019/0015160 | A1* | 1/2019 | Maeda | A61B 8/0841 |
| 2024/0122653 | A1* | 4/2024 | Zhang | A61B 17/3403 |

OTHER PUBLICATIONS

EP application 24211661.4 filed Nov. 8, 2024—extended Search Report issued Apr. 7, 2025; 11 pages.

* cited by examiner

SYSTEMS AND METHODS OF DYNAMIC REACHABILITY VISUALIZATION FOR TRAJECTORY PLANNING

TECHNICAL FIELD

The subject matter disclosed herein relates to image processing and, more particularly, systems and methods for analyzing reachability for interventional needle trajectory planning.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Non-invasive imaging technologies allow images of the internal structures or features of a patient or other subject to be obtained without performing an invasive procedure on the patient or subject. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

A clinician may use non-invasive imaging device for trajectory planning and evaluation of an interventional procedure, such as a procedure using a biopsy or other needle, and/during the performance of such an interventional procedure. In the case of a needle insertion, for example, a clinician may plan a path of a medical implement from an entry point to a target point using images from multiple cross-section views. However, analyzing the multiple cross-section views together may be difficult, and movement of the medical implement along a planned trajectory may be limited by characteristics of a patient, properties of the imaging device, geometric limitations of the interventional system or operational environment, and so on.

BRIEF DESCRIPTION

The disclosed embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, a processor-implemented method includes accessing or acquiring one or more images from a medical imaging device. The processor-implemented method also includes receiving an indication of one or more constraints associated with one or more physical characteristics of the medical imaging device, an interventional device, or both, and receiving an indication of a target point in the one or more images. The target point may specify an intended target location of the interventional device. The processor-implemented method also includes determining corresponding reachability regions for each of the one or more images based on the target point and the one or more constraints. Each corresponding reachability region includes reachable paths for the interventional device between one or more reachable entry points and the target point. The processor-implemented method also includes overlaying the corresponding reachability regions upon each of the one or more images and displaying the one or more images via a display device.

In another embodiment, a system includes a medical imager device configured to acquire medical imagery in one or more planes. The system also includes a computing device communicatively coupled to the medical imager device configured to receive the medical imagery from the medical imager device. The computing device is also configured to receive an indication of one or more constraints associated with one or more physical characteristics of the medical imaging device, an interventional device, or both, and receive an indication of a target point in each of the one or more planes of the medical imagery. The target point specifies an intended target location of the interventional device. The computing device is also configured to determine corresponding reachability regions for each of the one or more planes of the medical imagery based on the target point and the one or more constraints. Each corresponding reachability region includes reachable paths for the interventional device between one or more reachable entry points and the target point. The computing device is also configured to overlay the corresponding reachability regions upon each of the one or more planes of the medical imagery and display the medical imagery via a display device.

In yet another embodiment, a computer-readable medium includes processor-executable code that when executed by a processor, causes the processor to access or acquire one or more images from a medical imaging device, receive an indication of one or more constraints associated with one or more physical characteristics of the medical imaging device, an interventional device, or both, and receive an indication of a target point in the one or more images. The target point specifies an intended target location of the interventional device. The processor-executable code may also cause the processor to determine corresponding reachability regions for each of the one or more images based on the target point and the one or more constraints. Each corresponding reachability region comprises reachable paths for the interventional device between one or more reachable entry points and the target point. The processor-executable code may also cause the processor to overlay the corresponding reachability regions upon each of the one or more images and display the one or more images via a display device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
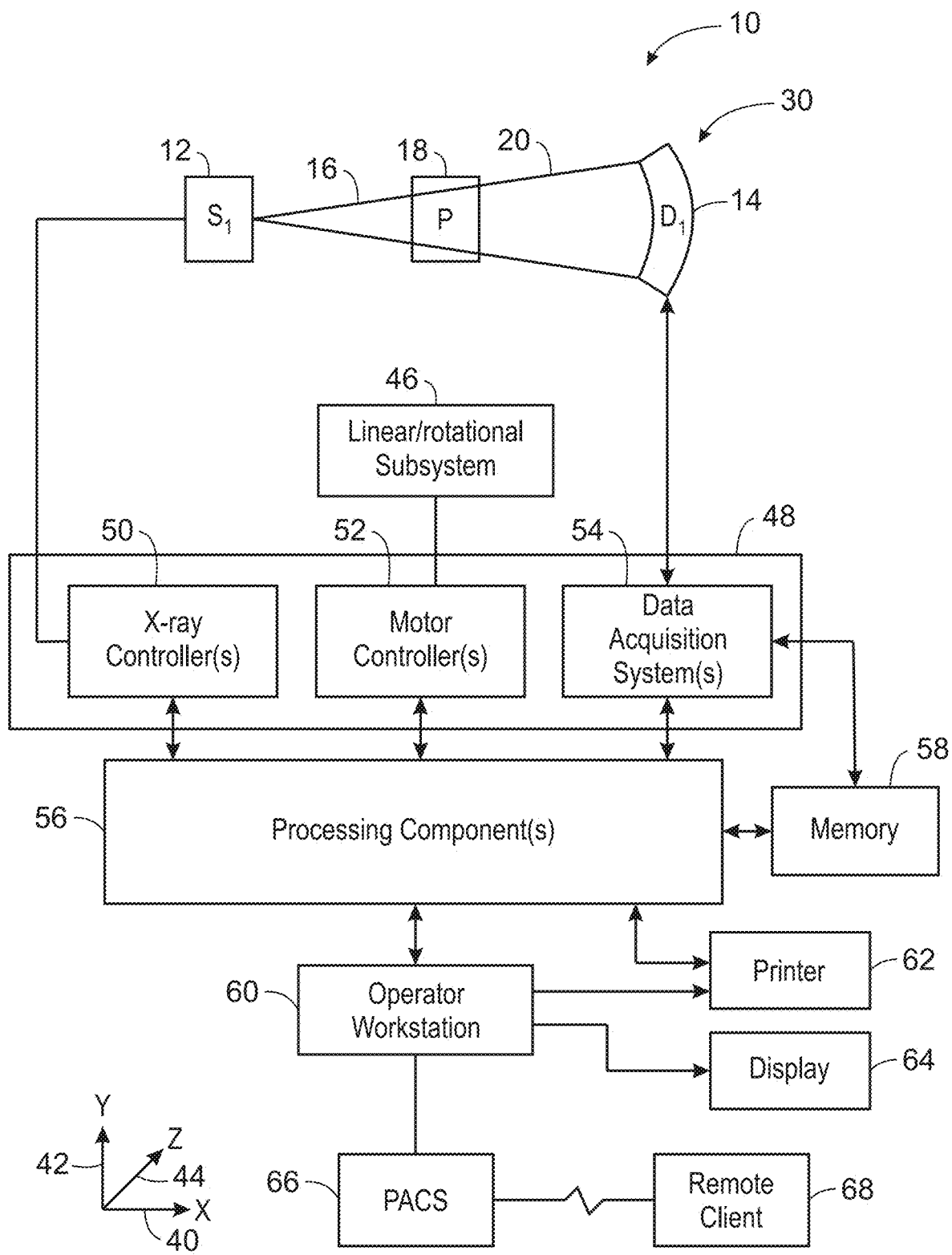
FIG. 1 is a diagrammatical view of an imaging system for use in producing images in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Any examples or illustrations given herein are not to be regarded in any way as restrictions on, limits to, or express definitions of, any term or terms with which they are utilized. Instead, these examples or illustrations are to be regarded as being described with respect to various particular embodiments and as illustrative only. Those of ordinary skill in the art will appreciate that any term or terms with which these examples or illustrations are utilized will encompass other embodiments that may or may not be given therewith or elsewhere in the specification and all such embodiments are intended to be included within the scope of that term or terms. Language designating such non-limiting examples and illustrations includes, but is not limited to: "for example," "for instance," "such as," "e.g.," "including," "in certain embodiments," "in some embodiments," and "in one (an) embodiment."

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Medical imaging devices have been used for decades to non-invasively acquire image data of internal structures or physiological processes of a subject, allowing appropriate medical diagnoses to be made, procedures to be planned, and care to be applied without injury to the subject. Examples of such medical imaging technologies include X-ray radiography, computed tomography (CT), magnetic resonance imaging (MRI), positron emission tomography (PET), single photon emission computed tomography (SPECT), mammography, ultrasound, and so forth. Traditionally, such imagery may be evaluated (i.e., read) by trained clinicians, such as radiologists, and advances in medical imaging technology have allowed such imagery to be acquired, process, accessed, and viewed electronically via graphical user interfaces.

As discussed herein, imagery captured by medical imaging devices may be used by a clinician to visualize a patient's anatomy in preparation for an interventional procedure. The imagery may be captured in one or more of several planes or cross sections through the patient. These planes include, for example, a sagittal plane passing through a patient anatomy vertically and longitudinally, a coronal plane vertical and perpendicular to the sagittal plane, and an axial (e.g., transverse) plane horizontal and perpendicular to the coronal and sagittal plane. Additionally, imagery may be acquired of a "bull's eye" view, or the plane perpendicular to the path of an interventional device and corresponding in general to the view seen down the length (e.g., down the bore) of the interventional device (e.g., needle). The plane with which imagery is acquired may be based on, for example, an orientation of the medical imaging device when the imagery was acquired, and techniques such as multi-planar reconstruction (MPR) may be implemented to reproduce the imagery in other planes, such that a clinician may analyze the subject anatomy from multiple viewing angles. The multiple viewing angles may be analyzed in conjunction to formulate a strategy for an interventional procedure. For instance, a clinician may use the multiple viewing angles to determine an optimal path (e.g., trajectory, angulation, placement) for an interventional device such as a needle.

Determining an optimal path for an interventional device may be challenging. The optimal path may include a target point at which the interventional device performs its function, such as a bone structure targeted for cementoplasty or an organ targeted for needle biopsy, and an entry point, such as a skin surface or bone structure exterior, and the area between the entry point (e.g., the starting point) and the target point (e.g., the final destination point) may include vital anatomical structures (e.g., major blood vessels) to be avoided by the interventional device, limiting potential paths for the interventional device. Additionally, characteristics of the interventional device, such as maneuvering capabilities of an imaging device, or of the operational environment, such as the height of a table a patient is laying on, may cause challenges in acquiring certain imagery valuable to planning or evaluating the interventional procedure and/or may represent limitations for the placement of the interventional device in terms of potential path trajectories.

A clinician may analyze a subject positioning and anatomy using medical imaging to establish preferred or estimated a target point and entry point. In particular, a clinician may establish a target point based on a medical image in a particular planar view, such as an oblique or sagittal planar view, and may determine an entry point based on the target point in the same planar view. The particular planar view may be chosen by the clinician for analysis based on, for example, an optimal visibility of vital anatomical structures intervening between the entry point and the target point that limit reachability. For example, certain bone structures may be occluded in one plane, but visible in another. In particular, while sagittal, coronal, and axial planes may provide useful information for pre-interventional analysis, a bull's eye view may better characterize the path of an interventional device during a procedure, and, as such, may be of particular utility for a clinician during interventional planning. However, in some cases, a bull's eye view of the path of an interventional device may be precluded because of maneuverability limitations of the imaging device, obstructions around the imaging device, and so on. As such, it may be desirable to display a region or range of entry points that, with a given target point, form a path with a bull's eye view that can be acquired or extrapolated by the imaging device.

Provided herein are techniques for dynamically displaying reachability information for interventional trajectory planning using medical imagery. The disclosed techniques may include acquiring medical imagery via a medical imaging device, reconstructing the medical imagery for display in multiple planes, and overlaying reachability regions upon the multiplanar medical imagery for analysis by a user (e.g., a clinician). As used herein, the term "reachability region" may be understood to mean a region of a cross-sectional view in which an entry point may be placed such that a path formed between the entry point and a target point has an associated bull's eye view that is acquirable by the medical imaging device. The target point may include a point, region, or area of interest of the anatomy of a patient, such as an interior bone structure, organ, or tissue to be accessed by an interventional device, and the entry point may represent an exterior surface in which an interventional device may be inserted or otherwise begin passage through the patient.

A clinician may, via graphical user interface (GUI) of a medical imager system, specify a target point, and a reachability region may be determined based on the target point and additional constraints. The reachability region may be determined for multiple planar views, and may be overlaid upon a medical image of each planar view. For example, a clinician may specify a target point in a sagittal planar view (e.g., via the GUI of the medical system), and reachability regions may be determined and displayed for the sagittal planar view, a coronal planar view, an axial planar view, and/or one or more oblique planar views. The reachability region may thus characterize regions in which a path (e.g., the area between an entry point and a target point) may be placed such that a bull's eye view may be acquired of the path. The imaging and/or interventional system may dynamically display each of these reachability regions, such that a clinician may analyze the reachability regions from multiple perspectives at once.

Additionally or alternatively, a clinician may specify an entry point, and a reachability region may be determined based on the entry point and additional constraints. In this case, the reachability region may specify regions in which a target point may be placed such that the path formed between the entry point and the target point may be imaged in a bull's eye view. A clinician may specify an entry point in a planar view (e.g., sagittal, coronal, axial, or oblique), and a reachability region may be determined for each displayed planar view. This implementation may be of particular use, for example, when a target point is relatively large or flexible, but entry point options are more limited or even fixed.

As mentioned, a reachability region may be determined based on additional constraints. The additional constraints may include lengths, widths, diameters, time amounts, temperatures, indications, anatomical properties of a patient, characteristics of an imaging device, characteristics of an interventional device, properties of the operational environment, and so on. For example, an interventional device or imaging device may have a limited reach, rotational range, or maneuverability that may limit reachability of a target point from an entry point. In another example, a height or angulation of a patient table (e.g., surgical table) may allow for additional angulation capabilities of an imaging device, and may thus expand a reachability region. Other examples of additional constraints include a body type or size of a patient, preferences of the patient or clinician, and components of an operating room that may obstruct the imaging device.

The reachability region may be updated dynamically (e.g., in real-time) for each planar view in response to inputs received from a user (e.g., selection or modification of the entry point and/or target point, rotation of the view, changes to configuration settings, such as the type of interventional device or needle, changes in patient positioning, and so forth). For example, the medical imaging device may change orientation during an imaging process via rotation of a gantry or adjustments to a patient table, and reachability regions may be dynamically updated and displayed as the orientation is changed. Reachability regions may also dynamically update based on a changed target point, changed constraints, and so on.

In the embodiment illustrated in FIG. 1, imaging system 10 includes a source of X-ray radiation 12 and a detector 14. The X-ray source 12 may be an X-ray tube or any other source of X-ray radiation suitable for the acquisition of medical or other images. The X-rays 16 generated by the source 12 pass into a region in which a patient 18, is positioned during a procedure. In the depicted example, the X-rays 16 are collimated to be a fan-shaped (planar) or cone-shaped (volumetric) beam, e.g., a fan-beam or cone-beam, which passes through the imaged volume. In a context where the imaging system 10 is used in a surgical support or navigation role, a collimator may be used to constrain the X-rays 16 to only irradiate a field-of-view (FOV) corresponding to specific portions of the patient 18, such as a region-of-interest (ROI) and to avoid other portions of the patient (such as sensitive organs) or the medical personnel. By way of example, in certain scenario specific implementations, different FOVs may be appropriate, such as a 9 inch and a 12 inch FOV, with the 9 inch FOV suitable for spine imaging and the 12 inch FOV suitable for peripheral (e.g., outside heart) endovascular imaging.

A portion of the X-ray radiation 20 passes through or around the patient 18 (or other subject of interest) and impacts a detector array, represented generally as the detector 14. Detector elements of the detector 14 produce electrical signals that represent the intensity of the incident X-rays 20. These signals are acquired and processed, as discussed herein, to reconstruct images of the features within the patient 18.

In the present example, the source 12 and detector 14 may be a part of an imager subsystem 30. In accordance with present embodiments, the source 12 and detector 14 of the imager 30 may be moved relative to the patient or imaged object along one or more axes during a scan procedure during which projection data is acquired. For example, the imager 30 may move about a first axis of rotation 40, a second axis of rotation 42, or a third axis of rotation 44, or any combination thereof. In one embodiment, the translation and rotation of the imager 30 may be determined or coordinated in accordance with a specified protocol, such as a protocol associated with an interventional procedure.

The movement of the imager 30 may be initiated and/or controlled by one or more linear/rotational subsystems 46. The linear/rotational subsystems 46 may include support structures, motors, gears, bearings, and the like, that enable the rotational and/or translational movement of the imager 30. In one embodiment, the linear/rotational subsystems 46 may include a structural apparatus (e.g., a C-arm imager apparatus having rotational movement about at least two axes) supporting the source 12 and the detector 14.

A system controller 48 may govern the linear/rotational subsystems 46 that initiate and/or control the movement of the components of the imager 30. In practice, the system controller 48 may incorporate one or more processing devices that include or communicate with tangible, non-transitory, machine readable media collectively storing instructions executable by the one or more processors to perform the operations described herein. The system controller 48 may also include features that control the timing of the activation of the source 12, for example, to control the acquisition of X-ray attenuation data obtained during a particular imaging sequence. The system controller 48 may also execute various signal processing and filtration functions, such as for initial adjustment of dynamic ranges, interleaving of digital projection data, and so forth. Therefore, in general, the system controller 48 may be considered to command operation of the imaging system 10 to execute examination protocols. It should be noted that, to facilitate discussion, reference is made below to the system controller 48 as being the unit that controls acquisitions, movements, and so forth, using the imager. However, embodiments where the system controller 48 acts in conjunction with other control devices (e.g., other control circuitry local to the imagers or remote to the system 10) are also encompassed by the present disclosure.

In the present context, the system controller 48 includes signal processing circuitry and various other circuitry that enables the system controller 48 to control the operation of the imager 30 and the linear/rotational subsystems 46. In the illustrated embodiment, the circuitry may include an X-ray controller 50 configured to operate the X-ray source 12. Circuitry of the system controller 48 may also include one or more motor controllers 52. The motor controllers 52 may control the activation of various components that are responsible for moving the source 12 and the detector 14. In other words, the motor controllers may implement a particular acquisition trajectory or motion for the components of the imager 30.

The system controller 48 is also illustrated as including one or more data acquisition systems 54. Generally, the detector 14 may be coupled to the system controller 48, and more particularly to the data acquisition systems 54. The data acquisition systems 54 may receive data collected by read out electronics of the detector 14 and in certain embodiments may process the data (e.g., by converting analog to digital signals or to perform other filtering, transformations, or similar operations).

It should be noted that the tangible, non-transitory, machine-readable media and the processors that are configured to perform the instructions stored on this media that are present in the system 10 may be shared between the various components of the system controller 48 or other components of the system 10. For instance, as illustrated, the X-ray controller 50, the motor controller 52, and the data acquisition systems 54 may share one or more processing components 56 that are each specifically configured to cooperate with one or more memory devices 58 storing instructions that, when executed by the processing components 56, perform image acquisition and reconstruction techniques. Further, the processing components 56 and the memory components 58 may coordinate in order to perform various image reconstruction processes.

The system controller 48 and the various circuitry that it includes, as well as the processing and memory components 56, 58, may be accessed or otherwise controlled by an operator via an operator workstation 60. The operator workstation 60 may include any application-specific or general-purpose computer that may include one or more programs (for example one or more imaging programs) capable of enabling operator input for the techniques described herein. The operator workstation 60 may include various input devices such as a mouse, a keyboard, a trackball, or any other similar feature that enables the operator to interact with the computer. The operator workstation 60 may enable the operator to control various imaging parameters, for example, by adjusting certain instructions stored on the memory devices 58.

The operator workstation 60 may be communicatively coupled to a printer 62 for printing images, patient data, and the like. The operator workstation 60 may also be in communication with a display 64 that enables the operator to view various parameters in real time, to view images produced by the acquired data, and the like. The operator workstation 60 may also, in certain embodiments, be communicatively coupled to a picture archiving and communication system (PACS) 66. Such a system may enable the storage of patient data, patient images, image acquisition parameters, and the like. This stored information may be shared throughout the imaging facility and may also be shared with other facilities, for example, a remote client 68. The remote client 68 may include hospitals, doctors' offices, or any other similar client.

Figure 2:
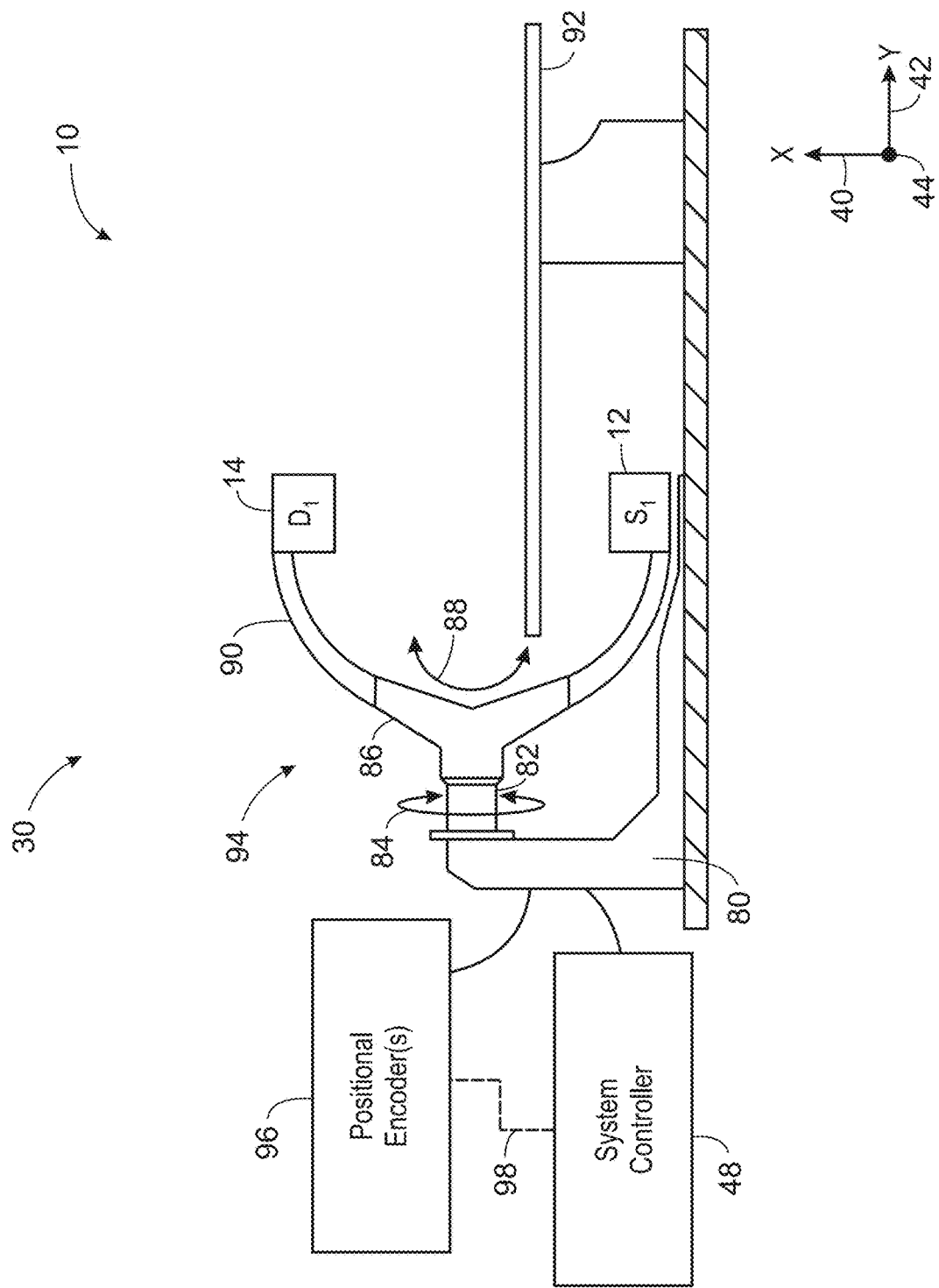
FIG. 2 is a schematic side view of a C-arm imager system representing features of such an imager, in accordance with aspects of the present disclosure.

Various aspects of the present approaches may be further appreciated with respect to FIG. 2, which provides useful context and background in the depiction of a C-arm imager system which may have certain features in common with certain implementations of the present invention. In this example, the imager 30, as illustrated, includes a base 80 and a rotatable extension 82 extending from the base 80. In the illustrated embodiment, the base 80 is a floor-mounted base such that the imager 30 may be secured to a floor of an imaging area in which it is positioned. In other embodiments, however, the base 80 may be secured to other surfaces (e.g., a wall or ceiling) and/or may be mobile or movable, such as to be moved toward or away from a patient undergoing a procedure for on-demand imaging during the procedure.

The rotatable extension 82 is depicted as extending generally along the second axis of rotation 42, and enables the source 12 and the detector 14 to move about the second axis of rotation 42. For example, the rotatable extension 82 may enable the source 12 and the detector 14 to move about the second axis of rotation 42 in a manner that maintains their position relative to one another throughout the movement. The rotation enabled by the rotatable extension 82 is shown as double-headed arrow 84. The rotatable extension 82 is coupled to a moving structure 86 (e.g., directly or indirectly via an extension arm), which enables the source 12 and the detector 14 to move about the third axis of rotation 44. This rotation about the third axis of rotation 44 is depicted as double-headed arrow 88.

The moving structure 86 may be a geared or track structure that is movably coupled to a support structure 90 that physically supports the source 12 and the detector 14, and may be in the form of a C-arm imager system, or any other shape (e.g., other dual-arm shapes) that positions the source 12 and the detector 14 on either side of the patient 18. As illustrated, the support structure 90 includes an arcuate structure that extends from a first side of a patient table 92, around the patient table 92, and to a second side of the patient table 92. In this way, the source 12 and the detector 14 generally remain positioned at opposite ends and/or on opposite sides of the patient (not shown) positioned on patient table 92. Together, the base 80, the rotatable extension 82, the moving structure 86, and the support structure 90 may be considered to be the structure 94 of the imager 30.

The imager 30 may include various motors, actuators, or other features responsible for movement of the various structures of the imager 30, and they may be communicatively coupled to one or more positional encoders 96. The one or more positional encoders 96 may encode the respective positions of any one or more components of the imager 30 in a manner that facilitates processing by the system controller 48. In such an implementation, the positional encoders 96 may provide feedback 98 (for example via wired or wireless signals) to the system controller 48. The system controller 48 may use this feedback 98 to control the imager 30.

As an example, the system controller 48 may simultaneously move the source 12 and the detector 14 together about the first axis of rotation 40, the second axis of rotation 42, or the third axis of rotation 44, or any combination thereof, and obtain X-ray attenuation data for a subset of the traversed view angles. In one embodiment, the system controller 48 may receive positional information from the positional encoders 96 relating to the imager 30 and may calculate a trajectory (or update a modeled trajectory) for either or for both of the source and detector 12, 14 using this positional feedback information.

Furthermore, the system controller 48 or other image reconstruction circuitry may synthesize one or more images (e.g., volumetric images) using data obtained by the imager 30. Reconstruction algorithms may be used to reconstruct a 3D volumetric image or multi-planar images of the imaged region of interest. In one embodiment, the imager 30 may perform an acquisition of data using an acquisition trajectory over which the source 12 and detector 14 move relative to the patient 18. The imager may be mobile (e.g., on wheels), so it can easily be moved to or within the surgical suite. Real-time images acquired using such a system may be useful in supporting and simplifying surgical and/or other interventional procedures.

Figure 3:
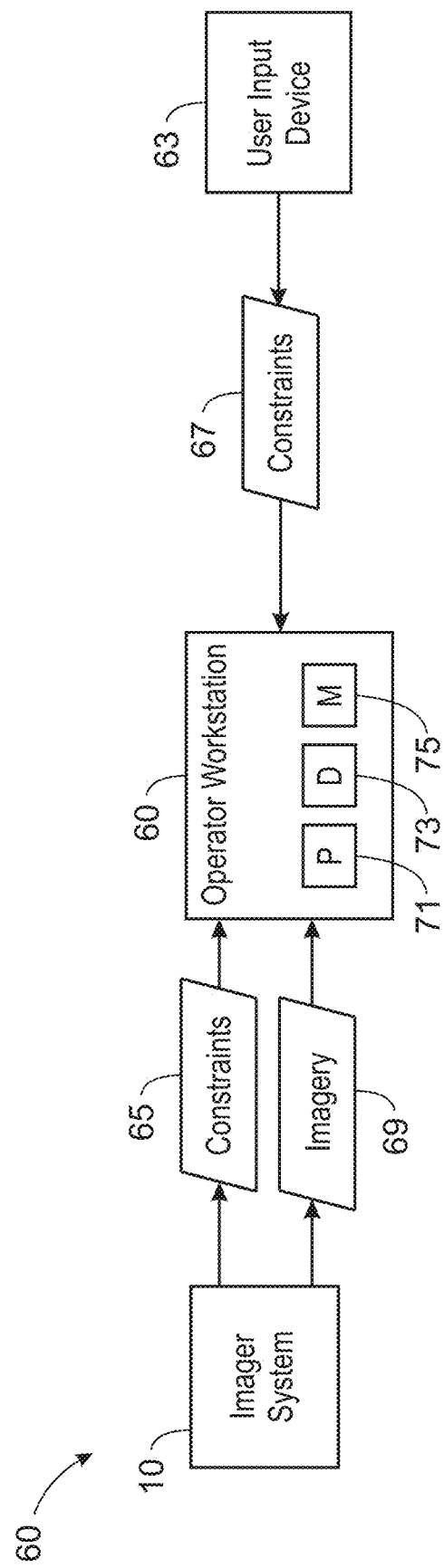
FIG. 3 is a block diagram illustrating communications between an imager system, a computing device, and a user input device of a dynamic reachability visualization system, in accordance with embodiments of the present disclosure.

FIG. 3 shows communication pathways between the C-arm imager system 10), the operator workstation 60, and a user input device 63 of a dynamic reachability visualization system 60. In the illustrated embodiment, the operator workstation 60 may receive imagery 69 from the C-arm imager system 10, such as the sampled digitized X-ray data.

The operator workstation 60 may store the received imagery 69 in memory 75 and/or a mass storage device. In addition, the operator workstation 60 may receive constraints 65 (e.g., additional constraints) from the imager system 10 and additional constraints 67 from a user input device 63. The imager system 10 may, for example, store a set of constraints 65, such as extension lengths, angulations, and the like that may be related to properties of the imager system 10. The constraints 65 may be stored in memory of the imager system 10 and sent to the operator workstation 60 upon request from the operator workstation 60 to be stored in the memory 75 of the operator workstation 60.

Additionally or alternatively, additional constraints 67 may be manually input via the user input device 63. For example, the user input device 63 may include a keyboard and mouse user to interface with a graphical user interface displayed by the display 73. It may be appreciated that certain imager devices may not facilitate storage and communication of constraints. As such, a clinician may manually input constraints associated with the imager device via the user input device 63. Additionally, in some embodiments, information input by a clinician may not be associated with the imager system 10, but may indeed affect reachability of a bull's eye view by the imager system 10. For example, the clinician may input relevant patient information, such as a body type or spinal curvature, or environmental information, such as possible angulations of a surgical table, that may affect reachability of the imager system 10 towards a position necessary to acquire a bull's eye view. The additional constraints 67 may also include a target point or entry point input by the clinician, and the target point or entry point may be used to generate a reachability region. In any case, the computing device may store the received constraints 65 and additional constraints 67 in the memory 75, and may access them as part of, for example, a reachability determination.

Other embodiments for ascertaining constraints are envisioned. For example, the operator workstation 60 may store a set of profiles in the memory 75, and each profile may include constraints applicable to certain interventional procedures and/or interventional devices. The clinician may select, via a graphical user interface of the operator workstation 60, a profile associated with a certain procedure, certain interventional device, and/or certain imager system/device, and a reachability region may be determined based on the selected profile. For example, a clinician may select a profile of a cementoplasty needle including applicable constraints (e.g., a maximum length of 5 inches, a diameter of 3-5 millimeters) and a C-arm imager system, and a reachability region may be determined based on the applicable constraints.

The operator workstation 60 may, via a processor 71 or other suitable means, generate a multi-planar reconstruction of the imagery 69 and display the multi-planar reconstruction via the display 73. The multi-planar reconstruction may include sagittal, coronal, axial, oblique, and/or bull's eye cross-sectional views, and each cross-sectional view may be displayed as part of a graphical user interface, as will be described in detail below. Additionally or alternatively, the operator workstation 60 may generate and display the bull's eye view in response to user input. For example, a clinician may analyze sagittal, coronal, and oblique cross-sections to determine a suitable target point, and subsequently use the bull's eye view for procedural planning. In addition, the operator workstation 60 may, via the processor 71, generate reachability regions for each displayed cross-sectional view based on the received imagery 69, the constraints 65, and the additional constraints 67.

Figure 4:
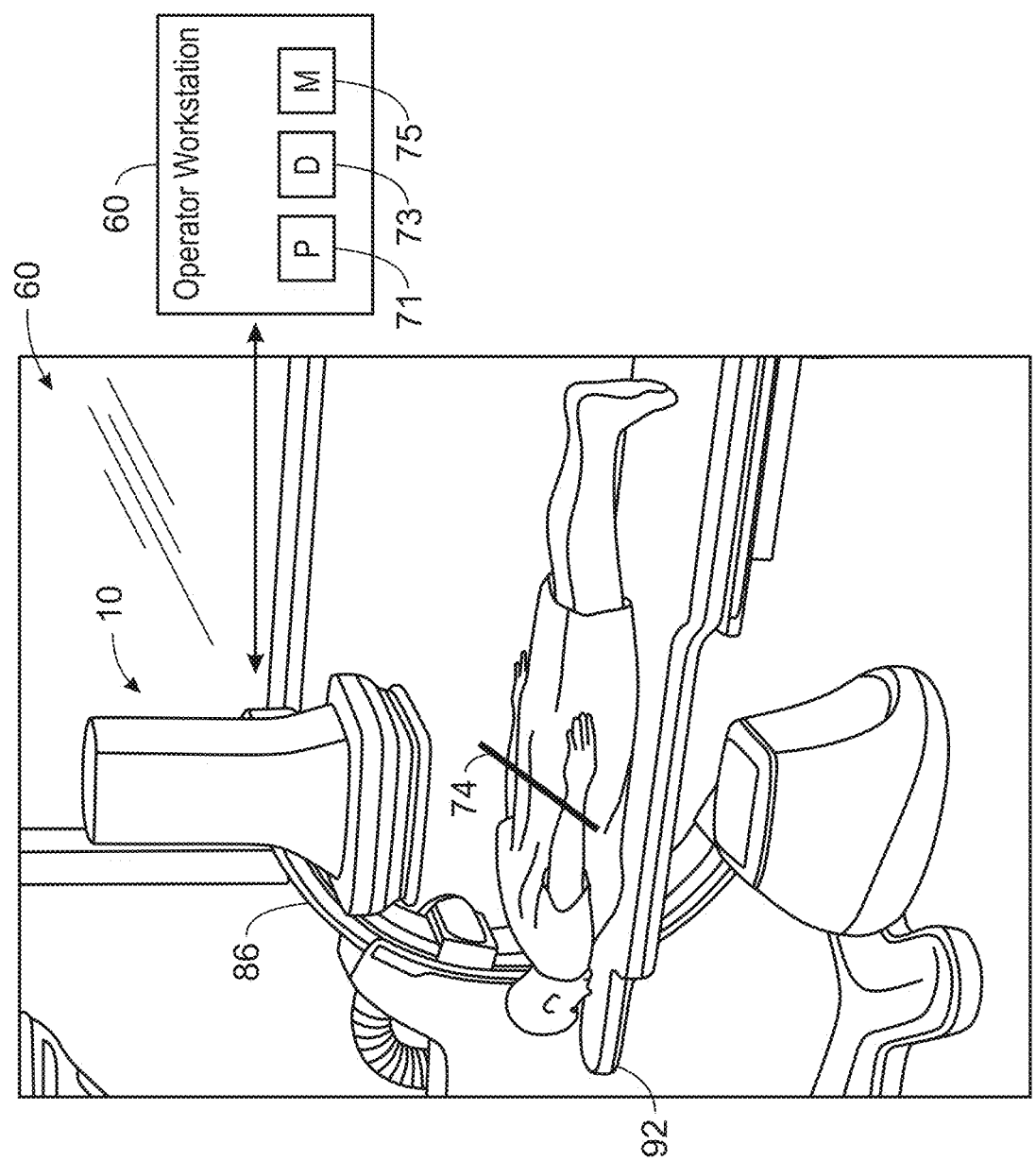
FIG. 4 is a block diagram of the imager system and patient and of a computing device illustrated in an operational environment, in accordance with embodiments of the present disclosure.

FIG. 4 is an illustration of the dynamic reachability visualization system 60 including the C-arm imager system 10 and the operator workstation 60, and may be described with reference to FIGS. 1 and 2. In the illustrated embodiment, the moving structure 86 of the C-arm imager system 10 is at an initial position (e.g., perpendicular to a patient table 92 prior to rotation about a center of rotation. The imager system 10 may capture imagery (e.g., of an anatomy of a patient) in one plane (e.g., a plane parallel to the patient table 92) and send the imagery to the operator workstation 60. The operator workstation 60 may, via the processor 71, implement a multi-planar reconstruction to generate multiple cross-sectional views based on the imagery, and a clinician may specify a target point in the multiple cross-sectional views. Based on the specified target point, reachability regions may be displayed to the clinician via a graphical user interface, and the clinician may select an entry point within the reachability regions. As illustrated, the path 74 is formed between the entry point and the target point, specifying the angulation with which an interventional device may be used during an interventional procedure.

Figure 5:
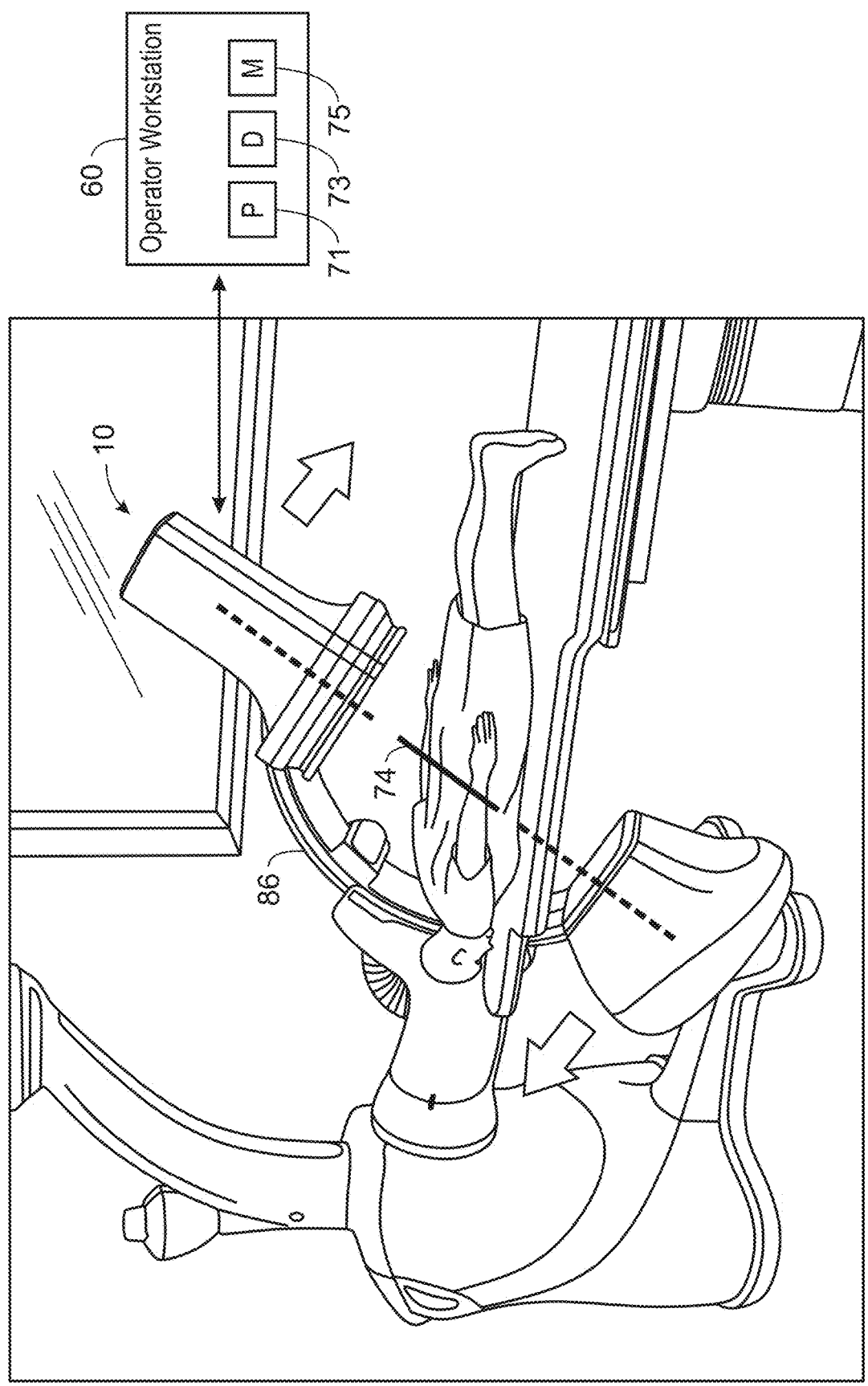
FIG. 5 is a block diagram of the imager system and computing device of FIG. 3 illustrated in an operational environment, in which the imager system maneuvers to acquire medical imagery, in accordance with embodiments of the present disclosure.

FIG. 5 illustrates the dynamic reachability visualization system 60, in which the moving structure 86 of the C-arm imager system 10 and the components thereon are rotated about a center of rotation to reach a position in which a bull's eye view of the path 74 may be acquired. In doing so, the bull's eye view may be determined as reachable, and the reachability may be displayed to a clinician via a graphical user interface. It should be noted that this reachability determination is used for illustrative purposes to present a path with a bull's eye view that is reachable by the imager system 10. Indeed, the techniques used herein may determine reachability based on a target point and additional constraints, and may not maneuver the moving structure 86 or other components of the imager system 10 to determine reachability. That is, reachability regions may be determined in real-time without moving structure 86 or other components of the imager system 10.

Figure 6:
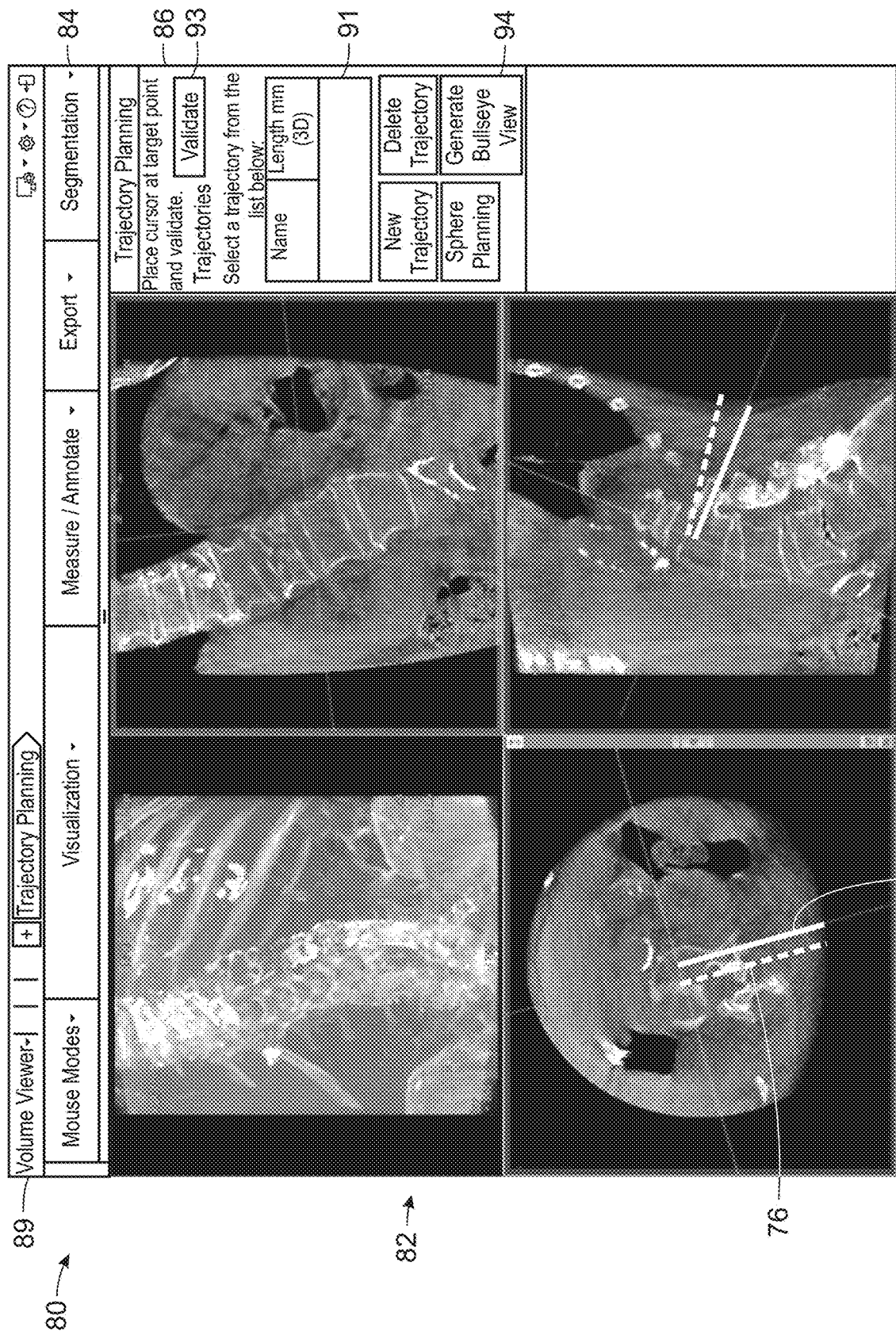
FIG. 6 is an illustration of a graphical user interface for the imager system of FIG. 2, in accordance with embodiments of the present disclosure.

To display cross-sectional views and associated reachability regions, a graphical user interface, such as graphical user interface 80 of FIG. 6, may be implemented. The graphical user interface may, for example, be displayed to a clinician on the display 73 of the operator workstation 60, and the memory 75 of the operator workstation 60 may include processor-executable instructions to update the graphical user interface 80. The graphical user interface 80 may include components such as aesthetics 89 (e.g., logos, slogans, and so forth), a trajectory planning window 86, and medical images 83. In the illustrated embodiment, the medical images 83 include four oblique cross-sectional views generated using multi-planar reconstruction, and display of the oblique cross-sectional views may aid a clinician in planning for spinal kyphoplasty, for example, or other interventional procedures. The medical images 83 may also provide supplemental patient information, information related to a medical imaging device, properties of an interventional device, and so on.

A clinician may, via the graphical user interface 80, select a target point on or in one or more of the medical images 83, such as by selecting a point or region of an anatomic structure depicted in one of the medical images 83. As discussed, the target point may be related to a point of interest, such as an anatomical structure or feature at which a kyphoplasty device is to be inserted. A clinician may then validate the selected target point (e.g., the point at perpendicular lines cross in the medical images 83) using a validation button 93 included as part of the trajectory planning window 86. A list of optimal trajectories (e.g., optimal paths) may then be generated and display in the trajectory list window 91. The optimal trajectories may be generated and/or determined based on the imagery used to generate the medical images 83, constraints received from a medical imager system (e.g., the constraints 65 of FIG. 3) and additional constraints input by a clinician via a user input device (e.g., the constraints 65 of FIG. 3). Additionally or alternatively, the optimal trajectories may be included as part of a determined reachability region, and thus the optimal trajectories may be determined based on the reachability region. The optimal trajectories may be chosen and/or ordered in the trajectory list window 91 based on qualities of each trajectory in a reachability region, such as a length of each optimal trajectory. That is, the trajectory list window may order the optimal trajectories in order of ascending length or other sorting criteria (e.g., proximity to vasculature or non-target organ at risk of damage, proximity to pain sensitive anatomy, other difficulty factors in addition to path length, and so forth).

The trajectory list window 91 may generate a name (e.g., label, descriptor) for each optimal trajectory, and display the name along with a determined length of each optimal trajectory. A clinician may select an optimal trajectory from the trajectory list window via, for example, input from a user input device, and an interventional device may be overlaid upon each of the medical images based on the selected optimal trajectory. The overlaid interventional device may characterize the selected optimal trajectory for each cross-sectional view displayed in the medical images 83, allowing a clinician to analyze potential paths for an interventional device in multiple planes.

The trajectory planning window may also include a bull's eye view generation button 94. The bull's eye view generation button 94 may be selected, for example, after selecting an optimal trajectory from the trajectory list window 91, and may generate and display a bull's eye view (e.g., a view as would be seen down the length or bore of the interventional device) for the selected optimal trajectory. The bull's eye view may be generated based on a multi-planar reconstruction technique, such as the technique used to generate the oblique cross-sectional views of the medical images 83. Alternatively, the operator workstation 60 may send instructions to the associated medical imaging device to rotate such that it may acquire imagery for the bull's eye view, the imaging device may send the imagery to the operator workstation 60, and the operator workstation 60 may display the bull's eye view via the graphical user interface 80.

The graphical user interface 80 may also display the bull's eye view dynamically in response to other events. For example, the operator workstation 60 may generate a bull's eye view for a selected optimal path when an optimal path is selected from the trajectory list window. That is, the graphical user interface 80 may display the bull's eye view when a trajectory is determined without user input instructing the graphical user interface 80 to display the bull's eye view.

If, however, direct imagery of the bull's eye view is unreachable by the imager system for a selected path (e.g., the path 74), an alternative path 76 may be generated and displayed. This alternative path 76 may include, for example, a path that is proximate to the selected path and reachable by the imager system. The alternative path 76 may be determined, for example, by selecting, from the reachability region, a path with a target point near the target point of the selected optimal path and an entry point near the entry point of the selected optimal path. The alternative path 76 may be displayed as part of the graphical user interface 80 and, as such, may serve to suggest a next-best option when a selected path is not reachable by the imager system. As illustrated, the alternative path 76 may be displayed alongside the selected path 74, and may be visually differentiated from the selected path with colored indicators or other means. In other embodiments, the alternative path 76 may be displayed instead of a selected path. That is, the selected path may be removed from the graphical user interface 80, and the alternative path 76 may be displayed.

Alternatively, should direct imagery of the bull's eye view be unreachable by the imager system, an indication of unreachability may be displayed. The indication of unreachability may include an error message displayed on the graphical user interface 80 including an indication that a bull's eye view may not be generated and/or displayed for a selected optimal trajectory. The indication may also include the bull's eye generation button 94 being dulled, crossed through, deleted, or otherwise indicated as unavailable.

Figure 7:
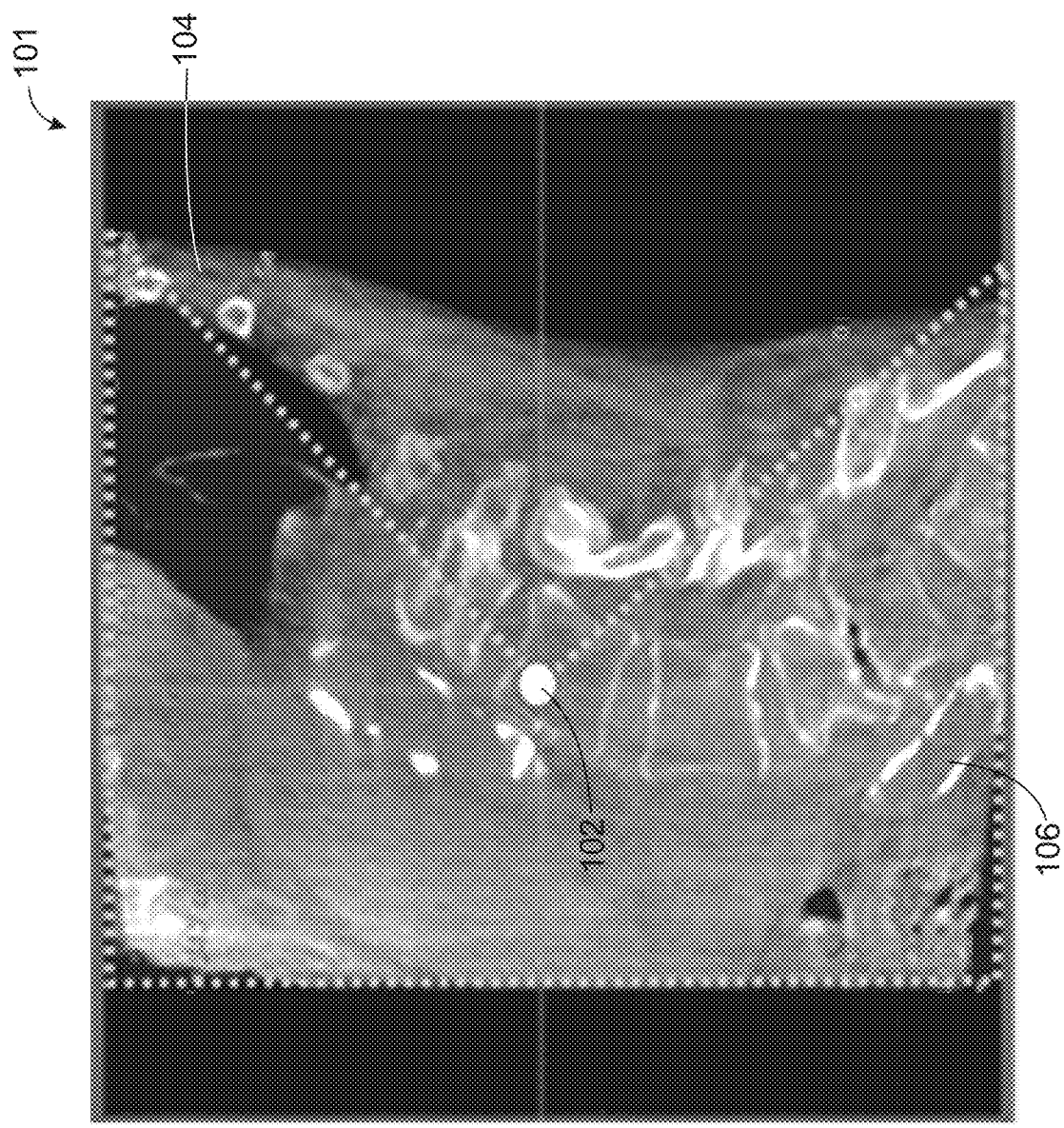
FIG. 7 is an illustration of a medical image displayed on the graphical user interface of FIG. 6 including a reachability region, in accordance with embodiments of the present disclosure.

Along with the list, reachability regions may be displayed (e.g., overlaid) on the medical images 83. FIG. 7 illustrates a medical image 101 that may be included as part of medical images displayed by a graphical user interface 80, including a reachability region 104, and inversely, an unreachability region 106. In the illustrated embodiment, the portion of the medical image 101 that includes the reachability region is left unaltered, while the unreachability region 106 is indicated by a shaded region, and boundaries of the unreachability region 106 are defined by a dotted line of the same shade. In other embodiments, differentiation between the reachability region and the unreachability region may be indicated differently. For example, a reachability region may be shaded while an unreachability region may be left unaltered, a reachability region and an unreachability region may be shaded differently (e.g., with different colors), and so on.

The reachability region 104 may define a region of a patient's anatomy in which an entry point may be placed such that a medical imager system may maneuver to acquire a bull's eye view of a trajectory formed between the entry point and the target point. As illustrated, a target point 102 has been selected by a clinician and is displayed upon the medical image 101. A reachability region may then be generated based on the target point 102 and other constraints (e.g., the constraints 65 and the additional constraints 67 of the dynamic reachability visualization system 60). For example, the unreachability region 106 may be determined based on rotational limitations of a gantry. As such, should an entry point be selected within the unreachability region 106, the medical imager system may not be able to acquire a bull's eye view of the path formed between the entry point and the selected target point 102. On the contrary, should an entry point be selected within the reachability region 104, the medical imager system may be able to acquire a bull's eye view of the path formed between the entry point and the selected target point 102.

While one medical image 101 is illustrated in FIG. 7, it should be noted that multiple including reachability regions and unreachability regions may be displayed as part of, for example, the graphical user interface 80. A clinician may define a target point in each medical image (e.g., the medical image 101), and reachability regions may be generated and displayed for each medical image based on respective target points such that, when analyzed together, the medical images provide a three-dimensional definition of the reachability region. Additionally, while the reachability region 104 and the unreachability region 106 are contiguous in the illustrated embodiment, in other embodiments, the reachability region 104 and/or the unreachability region 106 may be divided into multiple reachability regions and/or unreachability regions.

Figure 8:
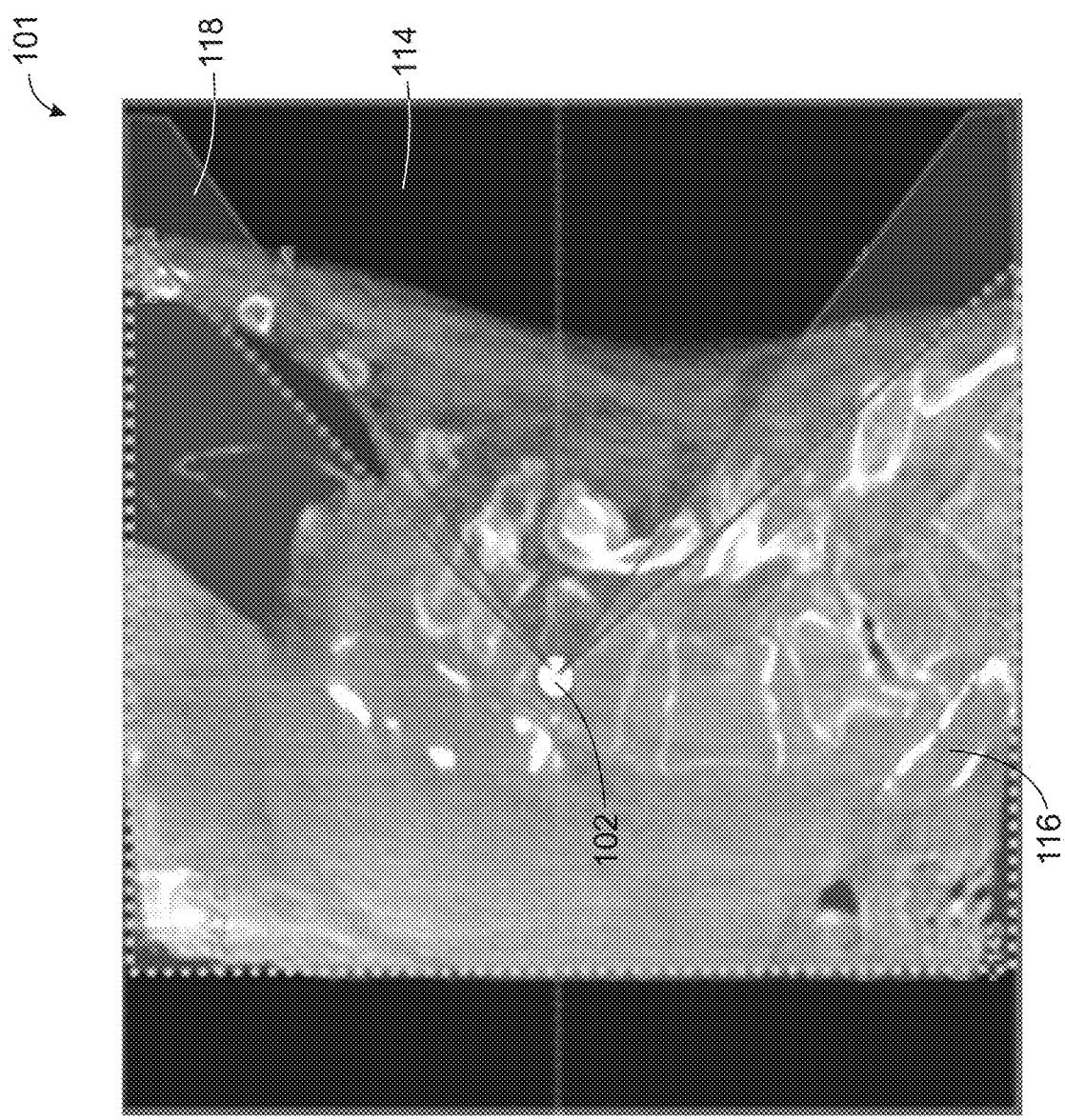
FIG. 8 is an illustration of a medical image displayed on the graphical user interface of FIG. 6 including a reachability region and buffer regions, in accordance with embodiments of the present disclosure.

FIG. 8 illustrates the medical image 101, in which the reachability region 114 and the unreachability region 116 are bounded by buffer regions 118. The buffer regions 118 may be determined on constraints and may, as in the illustrated embodiment, be differentiated from the reachability region 114 and the unreachability region 116 with suitable visual indications. In an embodiment, the buffer regions 118 may define regions of a patient's anatomy in which an entry point may be placed such that, in some circumstances, the path formed between the entry point and the target point is unreachable, while in other circumstances, the path formed between the entry point and the target point may become reachable. That is, a path formed within a buffer region may be unreachable in a current configuration, but may be made reachable with adjustments to the configuration. For example, an entry point placed in the buffer regions 118 may form a path that is unreachable by an imager system, but adjustments to an operating table (e.g., height, angulation changes, extension or retraction) may obviate the unreachability. As such, a constraint may include a current and/or default configuration of an operating table and possible adjustments to the operating table. Additionally or alternatively, the buffer regions 118 may be determined based on a range value that may affect reachability, such as dimension of a patient (e.g., height, weight, BMI) being within a certain range.

The buffer regions 118 may also be determined based on a confidence level (e.g., confidence interval) associated with, for example, certain constraints. That is, the buffer regions 118 may define regions in which an entry point could be placed such that a reachable path may be formed with a certain confidence level. The confidence level may be based on, for example, weights assigned to constraints that favor certain constraints over others, and the confidence level may be displayed along with the buffer regions 118. In some embodiments, it may be assumed that a confidence level of an unreachability region indicates impossibility of a reachable path (e.g., 0% confidence), while the confidence level of a reachability region indicates near certainty of a reachable path (e.g., 100% confidence). Thus, buffer regions may serve to indicate a level of both possibility and uncertainty.

Figure 9:
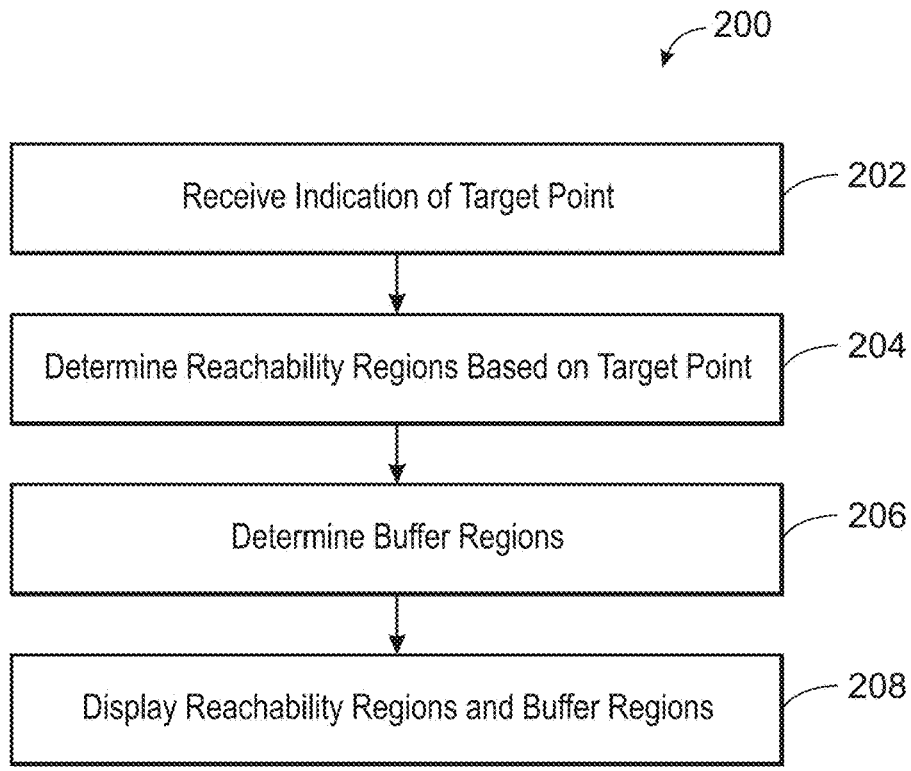
FIG. 9 is flow chart of a method for determining and displaying reachability regions based on a target point, in accordance with embodiments of the present disclosure.

FIG. 9 is a flow chart of a method 200 for determining and displaying reachability regions and buffer regions to visualize interventional reachability, and is described with reference to the previous figures. The following description of the method 200 is described as being performed by a computing device (e.g., the operator workstation 60), but it should be noted that any suitable processor-based device or system may be specially programmed to perform any of the methods described herein. Moreover, although the following description of the method 200 is described as including certain steps performed in a particular order, it should be understood that the steps of the method 200 may be performed in any suitable order, that certain steps may be omitted, and/or that certain steps may be added.

In block 202, an indication of a target point is received by the operator workstation 60 of the dynamic reachability visualization system 60 via a graphical user interface, such as the graphical user interface 80. The target point may indicate a point of interest for an interventional procedure, such as a location in a patient's anatomy an interventional device is to reach in order to perform a procedure. Further, the target point may be selected by the clinician in multiple medical images, such that the target point is defined in multiple planes (e.g., in X, Y, and Z axes).

In block 204, reachability regions are determined based on the target point. As discussed herein, the reachability region may also be determined based on constraints associated with an imager system, an interventional device, an anatomy of a patient, preferences of a clinician or the patient, and so on. In any case, a reachability region may define a region of a patient's anatomy in which an entry point may be placed such that a medical imager system may maneuver to acquire a bull's eye view of a trajectory formed between the entry point and the target point. Further, reachability regions may be determined each of multiple medical images of a graphical user interface based on the target point and constraints.

In addition to determining reachability regions, in block 206, buffer regions may be determined. As mentioned, the buffer regions may define regions of a patient's anatomy that are unreachable in a current configuration but may be made reachable with certain adjustments. Alternatively, the buffer regions may define regions with a confidence level based on, for example, differently weighted constraints.

In block 208, the reachability regions and buffer regions determined in blocks 204 and 206, respectively, are displayed as part of the graphical user interface. In particular, respective reachability regions and respective buffer regions may be displayed for each medical image displayed as part of a graphical user interface, providing a three-dimensional reachability visualization for a clinician. The reachability regions and buffer regions may be visually defined with shading, colors, boundaries, labels, and so on.

Figure 10:
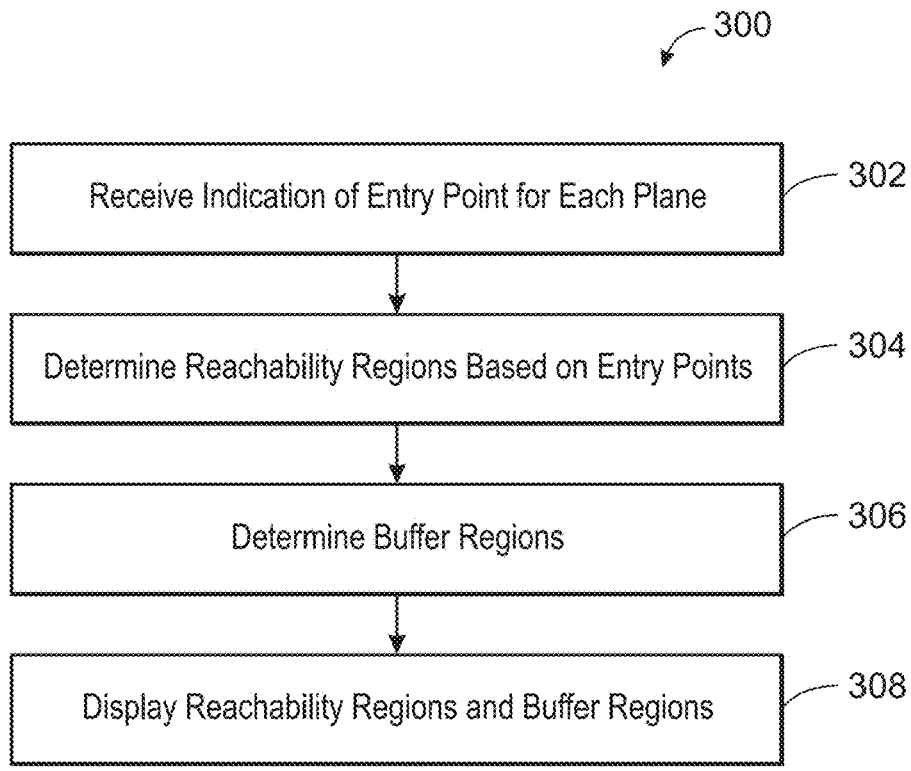
FIG. 10 is flow chart of a method for determining and displaying reachability regions based on an entry point, in accordance with embodiments of the present disclosure.

FIG. 10 is a flow chart of a method 300 for determining and displaying reachability regions and buffer regions to visualize interventional reachability, in which the reachability regions define reachable target points based on entry points selected by a clinician. The method 300 may be suitable for planning an interventional procedure in which there are many options for target points, but relatively few entry point options, for instance. The following description of the method 300 is described as being performed by a computing device (e.g., the operator workstation 60), but it should be noted that any suitable processor-based device or system may be specially programmed to perform any of the methods described herein. Moreover, although the following description of the method 70 is described as including certain steps performed in a particular order, it should be understood that the steps of the method 300 may be performed in any suitable order, that certain steps may be omitted, and/or that certain steps may be added.

In block 302, an indication of an entry point is received by the operator workstation 60 of the dynamic reachability visualization system 60 via a graphical user interface, such as the graphical user interface 80. The entry point may include the exterior of a skin structure, bone structure, or other anatomical structure that a clinician deems optimal. The entry point may be selected by the clinician in multiple medical images, such that the target point is defined in multiple planes (e.g., in X, Y, and Z axes), and may be defined by a region or range of optimal entry points.

In block 304, reachability regions are determined based on the entry point. As discussed herein, the reachability region may also be determined based on constraints associated with an imager system, an interventional device, an anatomy of a patient, preferences of a clinician or the patient, and so on. In any case, a reachability region may define a region of a patient's anatomy in which a target point may be placed such that a medical imager system may maneuver to acquire a bull's eye view of a trajectory formed between the entry point and the target point. Further, reachability regions may be determined each of multiple medical images of a graphical user interface based on the entry point and other constraints.

In block 306, buffer regions may be determined. As mentioned, the buffer regions may define regions of a patient's anatomy that are unreachable in a current configuration but may be made reachable with certain adjustments. Alternatively, the buffer regions may define regions with a confidence level based on, for example, differently weighted constraints.

In block 308, the reachability regions and buffer regions determined in blocks 304 and 306, respectively, are displayed as part of the graphical user interface. In particular, respective reachability regions and respective buffer regions may be displayed for each medical image displayed as part of a graphical user interface, providing a three-dimensional reachability visualization for a clinician. The reachability regions and buffer regions may be visually defined with shading, colors, boundaries, labels, and so on.

Figure 11:
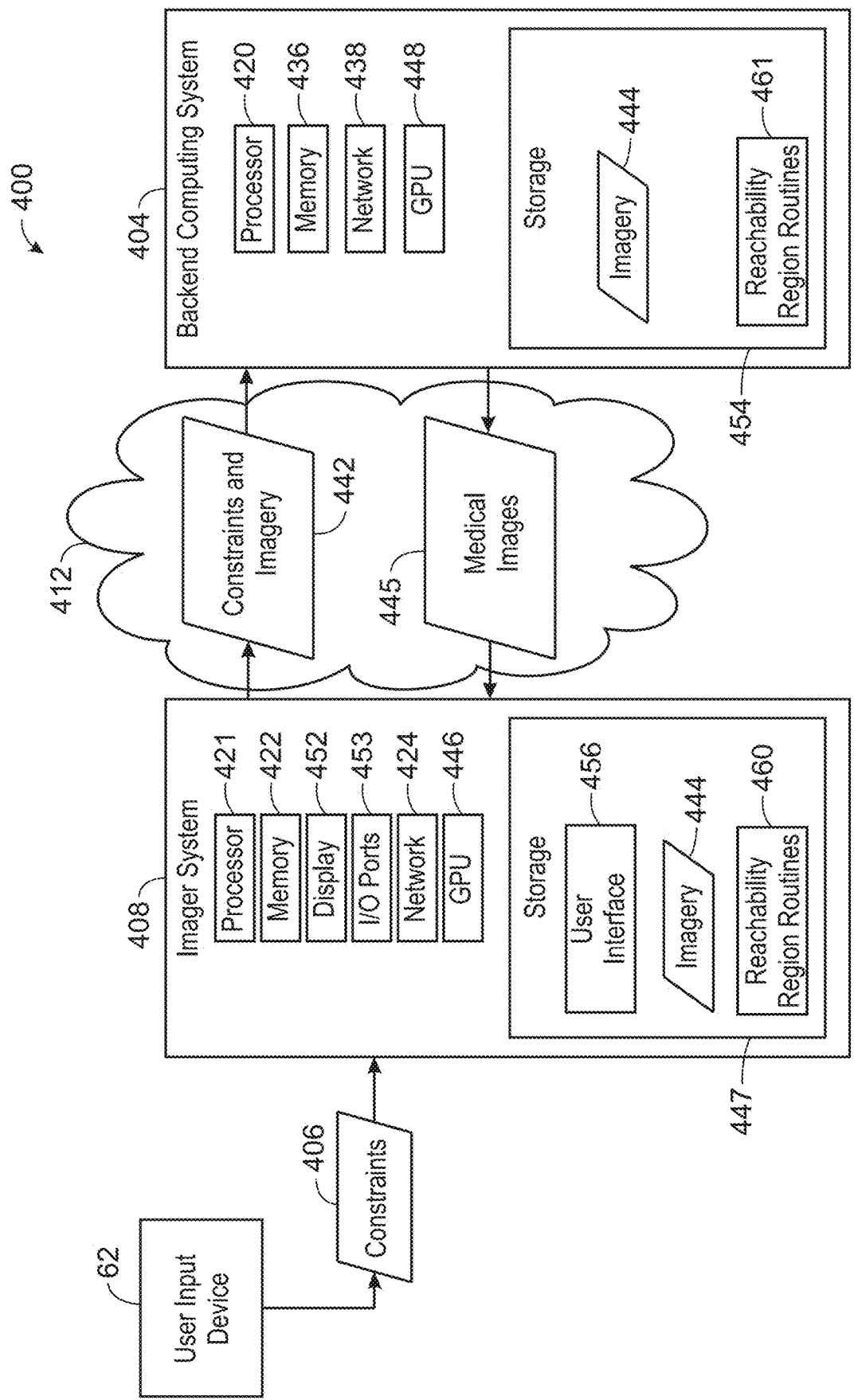
FIG. 11 is a diagram of a client-server architecture for medical image processing and display, in accordance with embodiments of the present technique.

With the preceding in mind, FIG. 11 illustrates an embodiment of client-server or cloud-based architecture 400 for medical image processing and analysis in accordance with the presently described techniques. In the depicted example, the client-server or cloud-based architecture 400 generally includes at least one backend computing system 404, and at least one frontend computing system, here represented as an imager system 408 (e.g., the C-arm imager system 10) that is communicatively coupled, directly or indirectly, via a suitable network 412 (e.g., a local area network (LAN), a wide area network (WAN), virtual private networks (VPN), the internet). In some embodiments, the operator workstation 60 may include at least one server deployed on a LAN of a medical facility. For embodiments in which the client-server architecture 400 is wholly or partially a cloud-based client-server architecture, the backend computing system 404 may include one or more rack-mounted servers deployed at a remote data center. The imager system 408 may include or may be coupled to a desktop or laptop computer of a clinician, for example, deployed on the LAN of a medical facility or coupled to the backend computing system 404 via a suitable network connection.

In the following description it should be appreciated that certain functionality may be implemented on the backend computing system 404, the frontend computing system (e.g., the imager system 408 and/or associated workstation), or both. As such certain routines and/or functionality may be described as possibly being present on both the backend computing system 304 and/or the imager system 408 (or associated workstation). In practice, such routines or functionality will likely be implemented on only one of the frontend or backend, as determined based on implementation and business specific decisions. For completeness, however, the present discussion will describe such functionality as potentially being implemented on either the front or back end.

With this in mind, in the depicted example, the backend computing system 404 includes at least one processor 420, at least one memory 436 (e.g., random access memory (RAM), read-only memory (ROM)), at least one networking device 438 (e.g., a wireless networking card, an Ethernet networking card), and at least one storage device 454 (e.g., non-transitory computer readable media, such as, but not limited to, a hard disk device, a solid-state disk device, a flash memory device). The processor 420 may include one or more central processing units (CPUs), each having one or more processing cores configured to execute instructions and process data loaded into the memory 436 from the storage 454. The backend graphics processing unit (GPU) 448 may perform multi-planar reconstruction on medical imagery such that the medical imagery may be analyzed and viewed in multiple cross-sectional views. The storage 454 of the backend computing system 404, in the present context, may store imagery 444 (e.g., medical images or scans), processor-executable routines for generating medical images 445 based on received constraints and imagery 442, processor-executable routines 460 for generating reachability regions based on target points and/or entry points and constraints, processor-executable routines for generating buffer regions, and/or processor-executable routines for overlaying target points, entry points, reachability regions, buffer regions, medical information, and the like on the medical imagery 444.

The frontend computing system, here represented as an imager system 408 or workstation associated with such an imager system, generally includes at least one processor 421, at least one memory 422 (e.g., random access memory (RAM), read-only memory (ROM)), at least one networking device 424 (e.g., a wireless networking card, an Ethernet networking card), and at least one storage 446 (e.g., non-transitory computer readable media, such as, but not limited to, a hard disk device, a solid-state disk device, a flash memory device). Additionally, the imager system 408 includes input/output (I/O) ports 453 that may interface with a user input device 63, such as a keyboard, mouse, touchpad, touchscreen, speakers, displays, and so forth, which enable the clinician to provide inputs to, and receive the outputs of, the imager system 408. The inputs received from the user input device 63 may include, as described herein, constraints 406 input by a clinician. In certain embodiments, the imager system 408 includes at least one frontend graphics processing unit (GPU) 446 that is generally configured to perform graphical processing to present images on display devices of these imager system 408. In particular, the graphics processing unit 446 may perform multi-planar reconstruction on medical imagery such that the medical imagery may be analyzed and viewed in multiple cross-sectional views. The storage 447, in the present context, may store imagery 444 (e.g., medical images or scans), processor-executable routines 460 for determining reachability regions and the like used to process imagery 444 (or other suitable data), and/or one or more processor-executable user interface routines 456 used to display the imagery 444 as part of a graphical user interface along with other information, buttons, aesthetics, and the like.

In the depicted example, information is illustrated as being exchanged between the imager system 408 and the backend computing system 404. In practice, such data may include, but is not limited to, constraints and imagery 442 and medical images 445, which may be transmitted from the imager system 408 to the backend computing system 404, with the particular types of data transferred depending in part on where reachability region generation is performed.

By way of example, in a first implementation imagery 444 and constraints acquired by the imager system 408 (e.g., a C-arm imager system 10) may be transmitted to the backend computing system 304 as constraints and imagery 442, where it may be processed using the reachability region routines 460. In one such example, the constraints include a target point input by a clinician (e.g., via the user input device 63), and based on the target point, imagery, and additional constraints, the reachability region routines 460 may generate a reachability region. The reachability region may define a region of a patient's anatomy in which an entry point may be placed such that a medical imager system may maneuver to acquire a bull's eye view of a trajectory formed between the entry point and the target point. Additionally, the reachability region routines 460 may include routines for generating buffer regions based on the target point and constraints. Further, the generated reachability regions and buffer regions may be overlaid upon the medical imagery 444 and sent to the imager system 408 as medical images 445. The imager system 408 may then process the received medical images 445 using the user interface routines 456 such that they may be displayed via the display 452.

In another implementation, additional functionality may be performed on the frontend. In this example, the medical imagery 444 acquired by the imager system 408 (e.g., a C-arm imager system 10) may be processed on the imager system 408 (or other frontend system(s)) via locally implemented reachability region routines 460. In one such example, based on the target point, imagery, and additional constraints, the locally-implemented reachability region routines 460 may generate a reachability region and buffer regions for the imagery 444. The generated reachability regions and buffer regions may be overlaid upon the medical imagery 444, and the imager system 408 may, via the user interface routines 456, display the medical imagery 444 via the display 452 as medical images in a graphical user interface.

As may be appreciated from the preceding examples, aspects of the presently described techniques may be such as image processing, user input processing, and reachability region generation may be performed at one location or may be distributed between systems, such as between local and cloud-based systems. While the preceding examples relate certain possible implementation scenarios, it may be appreciated that other practical implementations may be performed and are contemplated by the present disclosure. Further, it may be appreciated that aspects of the preceding examples may be mixed to achieve hybrid implementations, such as where multiple imager systems 408 are present having different capabilities (e.g., different models) and thus may each perform different degrees of processing on the frontend. That is, in certain hybrid scenarios certain imager systems 408 may transmit unprocessed image data to the backend computing system 404 while other imager systems 408 may use locally-implemented routines to process medical imagery. Thus, the present examples should be understood in view of their intent to provide useful context and implementation scenarios, but not as an exhaustive listing of all possible implementations or permutations.

With the preceding discussion and explanation in mind, it may be appreciated that technical advantages of the presently disclosed techniques include, but are not limited to, improvements to imaging process and imager systems or devices in general, including medical imager systems and devices in particular. The present approaches may also be utilized in, and present technical advantages with respect to, any computing context that involves processing of data to improve visualization of the data, but not limited to, image data, video data, time-series data, and so forth. Correspondingly, the presently disclosed and described techniques improve and provide technical advantages in systems and devices in which they are implemented (e.g., computers and workstations, medical imager systems, image archival systems, and so forth. As a result, such improved devices may operate more efficiently in terms of providing superior operation or performance using the same or fewer resources (e.g., computational resources, network bandwidth, and so forth).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A processor-implemented method for visualizing operation of an interventional device on a patient, comprising:
    accessing or acquiring one or more images from a medical imaging device;
    receiving an indication of one or more constraints associated with one or more physical characteristics of the medical imaging device, an interventional device, or both;
    receiving an indication of a target point in the one or more images, wherein the target point specifies an intended location of the interventional device;
    determining corresponding reachability regions for each of the one or more images based on the target point and the one or more constraints, wherein each corresponding reachability region comprises reachable paths for the interventional device between one or more reachable entry points and the target point;
    determining corresponding buffer regions for each of the one or more images based on the target point and the one or more constraints, wherein the buffer regions comprise paths for the interventional device between one or more additional entry points and the target point, and wherein the buffer regions are associated with a reachability confidence interval;
    overlaying the corresponding reachability regions and the corresponding buffer regions upon each of the one or more images; and
    displaying the one or more images with the corresponding reachability regions and the corresponding buffer regions overlaid via a display device.

2. The processor-implemented method of claim 1, wherein the medical imaging device comprises a C-arm imager system, and wherein the one or more constraints comprise an angulation capability of the C-arm imager system, an extension capability of the C-arm imager system, a configuration of a patient table, or a combination thereof.

3. The processor-implemented method of claim 1, wherein the one or more constraints comprise one or more characteristics of an anatomy of the patient.

4. The processor-implemented method of claim 1, wherein the one or more constraints comprise an angulation capability of the interventional device, an extension capability of the interventional device, or both.

5. The processor-implemented method of claim 1, wherein the reachable paths for the interventional device comprise paths that the medical imaging device is capable of acquiring down-the-bore imagery of.

6. The processor-implemented method of claim 5, wherein the capability of the medical imaging device to acquire the down-the-bore imagery is based on the one or more constraints.

7. The processor-implemented method of claim 1, wherein the one or more images comprise sagittal cross-sectional views, coronal cross-sectional views, axial cross-sectional views, oblique cross-sectional views, or any combination thereof of an anatomy of the patient.

8. The processor-implemented method of claim 1, wherein the reachability confidence interval is determined based on weights assigned to each of the one or more constraints.

9. A system, comprising:
    a medical imager device configured to acquire medical imagery in one or more planes;
    a computing device communicatively coupled to the medical imager device configured to:
        receive the medical imagery from the medical imager device;
        receive an indication of one or more constraints associated with one or more physical characteristics of the medical imager device, an interventional device, or both;
        receive an indication of a target point in each of the one or more planes of the medical imagery, wherein the target point specifies an intended location of the interventional device;
        determine corresponding reachability regions for each of the one or more planes of the medical imagery based on the target point and the one or more constraints, wherein each corresponding reachability region comprises reachable paths for the interventional device between one or more reachable entry points and the target point;
        determine corresponding buffer regions for each of the one or more planes of the medical imagery based on the target point and the one or more constraints, wherein the buffer regions comprise paths for the interventional device between one or more additional entry points and the target point, and wherein the buffer regions are associated with a reachability confidence interval;
        overlay the corresponding reachability regions and the corresponding buffer regions upon each of the one or more planes of the medical imagery; and
        display the one or more planes of the medical imagery with the corresponding reachability regions and the corresponding buffer regions overlaid via a display device.

10. The system of claim 9, comprising one or more user input device communicatively coupled to the computing device configured to accept user input comprising the one or more constraints.

11. The system of claim 9, wherein the computing device is configured to determine the corresponding reachability regions for each plane of the medical imagery, overlay the corresponding reachability regions upon each of the one or more planes of the medical imagery, and display the medical imagery via the display device in response to a user input via a graphical user interface (GUI).

12. The system of claim 9, wherein the one or more reachable entry points comprise an exterior of a bone structure or a skin surface of an anatomy of a patient.

13. The system of claim 9, wherein the interventional device comprises an interventional needle.

14. The system of claim 13, wherein the one or more constraints comprise an angulation capability of the interventional needle, an extension capability of the interventional needle, or both.

15. A non-transitory computer-readable medium, the computer-readable medium comprising processor-executable code that when executed by a processor, causes the processor to:
- access or acquire one or more images from a medical imaging device;
- receive an indication of one or more constraints associated with one or more physical characteristics of the medical imaging device, an interventional device, or both;
- receive an indication of a target point in the one or more images, wherein the target point specifies an intended location of the interventional device;
- determine corresponding reachability regions for each of the one or more images based on the target point and the one or more constraints, wherein each corresponding reachability region comprises reachable paths for the interventional device between one or more reachable entry points and the target point;
- receive an indication of a selected path between a selected entry point and a selected target point;
- determine that the selected path is unreachable based on the selected target point, the selected entry point, and the one or more constraints;
- determine one or more alternative paths for each of the one or more images within each of the corresponding reachability regions in response to the determination that the selected path is unreachable;
- overlay the corresponding reachability regions and the one or more alternative paths upon each of the one or more images; and
- display the one or more images with the corresponding reachability regions and the one or more alternative paths overlaid via a display device.

16. The non-transitory computer-readable medium of claim 15, comprising processor-executable code that when executed by the processor, causes the processor to:
- determine corresponding unreachability regions for each of the one or more images based on the target point and the one or more constraints, wherein each corresponding unreachability region comprises unreachable paths for the interventional device between one or more additional entry points and the target point; and
- overlay the corresponding unreachability regions upon each of the one or more images with the corresponding reachability regions and the one or more alternative paths overlaid.

17. The non-transitory computer-readable medium of claim 15, wherein the reachable paths for the interventional device comprise paths that the medical imaging device is capable of acquiring bull's eye imagery of.

18. The non-transitory computer-readable medium of claim 15, wherein the one or more alternative paths are determined based on a distance calculation between the selected path and the reachable paths.

\* \* \* \* \*